United States Patent
Tateiwa

(10) Patent No.: US 10,102,217 B2
(45) Date of Patent: Oct. 16, 2018

(54) NON-TRANSITORY COMPUTER-READABLE RECORDING MEDIUM HAVING STORED THEREIN DATA DIVIDING PROGRAM, DATA DIVIDING APPARATUS, AND DATA DIVIDING METHOD

(71) Applicant: FUJITSU LIMITED, Kawasaki-shi, Kanagawa (JP)

(72) Inventor: Yasunari Tateiwa, Izunokuni (JP)

(73) Assignee: FUJITSU LIMITED, Kawasaki (JP)

(*) Notice: Subject to any disclaimer, the term of this patent is extended or adjusted under 35 U.S.C. 154(b) by 452 days.

(21) Appl. No.: 14/613,442

(22) Filed: Feb. 4, 2015

(65) Prior Publication Data

US 2015/0254287 A1  Sep. 10, 2015

(30) Foreign Application Priority Data

Mar. 7, 2014 (JP) ................. 2014-045042

(51) Int. Cl.
G06F 17/30 (2006.01)

(52) U.S. Cl.
CPC .. *G06F 17/30194* (2013.01); *G06F 17/30887* (2013.01); *G06F 17/30902* (2013.01)

(58) Field of Classification Search
CPC .............................................. G06F 17/30194
USPC ....................................................... 707/755
See application file for complete search history.

(56) References Cited

U.S. PATENT DOCUMENTS

| | | | |
|---|---|---|---|
| 5,592,342 A | 1/1997 | Hall et al. | |
| 7,724,249 B1 | 5/2010 | Horikawa et al. | |
| 2008/0133561 A1 | 6/2008 | Dubnicki et al. | |
| 2011/0307659 A1* | 12/2011 | Hans | G06F 3/0613 711/114 |
| 2014/0012822 A1* | 1/2014 | Aronovich | G06F 3/0641 707/692 |
| 2014/0095439 A1* | 4/2014 | Ram | G06F 17/30159 707/640 |
| 2014/0375482 A1* | 12/2014 | Martin | H03M 7/4037 341/67 |

FOREIGN PATENT DOCUMENTS

| | | |
|---|---|---|
| EP | 0495983 A1 | 7/1992 |
| JP | 03-062137 | 3/1991 |
| JP | 3-218561 A | 9/1991 |

(Continued)

OTHER PUBLICATIONS

Japanese Office Action dated Sep. 5, 2017 for corresponding Japanese Patent Application No. 2014-045042, with Partial English Translation, 5 pages.

*Primary Examiner* — Pierre M Vital
*Assistant Examiner* — Alicia M Antoine
(74) *Attorney, Agent, or Firm* — Fujitsu Patent Center

(57) ABSTRACT

Disclosed are a specify unit that specifies a data candidate dividing position dividing a first partial binary data, based on a characteristic of predetermined data that is included in the binary data; a registration unit that registers information representing specified candidate dividing position to a dividing position information in a storage medium; and a judge unit validity of the candidate dividing position based on the dividing position information in the storage medium that includes at least information representing a data dividing position of another one of the plurality of partial binary data.

9 Claims, 19 Drawing Sheets

(56) References Cited

FOREIGN PATENT DOCUMENTS

| JP | 10-500793 | 1/1998 |
| JP | 2010-515114 A | 5/2010 |
| JP | 2012-118669 | 6/2012 |
| WO | 2008/070484 A2 | 6/2008 |

* cited by examiner

| TASK NUMBER | START POSITION | END POSITION |
|---|---|---|
| 1 | 0 | 64MB+ 904B |
| 2 | 64MB+905B | 128MB+ 381B |
| 3 | 128MB+382B | 128MB+2079B |

| RECORD LENGTH | DATA | RECORD LENGTH | RECORD LENGTH | DATA | RECORD LENGTH | ... |

# NON-TRANSITORY COMPUTER-READABLE RECORDING MEDIUM HAVING STORED THEREIN DATA DIVIDING PROGRAM, DATA DIVIDING APPARATUS, AND DATA DIVIDING METHOD

CROSS-REFERENCE TO RELATED APPLICATION

This application is based upon and claims the benefit of priority of the prior Japanese Patent application No. 2014-045042, filed on Mar. 7, 2014, the entire contents of which are incorporated herein by reference.

FIELD

The embodiments discussed herein are directed to a non-transitory computer-readable recording medium having stored therein data dividing program, a data dividing apparatus, and a data dividing method.

BACKGROUND

In recent years, there has been known a map-reduce type distributed processing system as a processing system for processing large-volume data, such as web data.

The map-reduce type distributed processing system divides data on the distributed processing system into units, called data blocks, and applies the data blocks map processing and reduce processing sequentially.

According to such a map-reduce type distributed processing system, a series of calculation processes for each data block can be distributed to a plurality of calculation nodes and be executed simultaneously.

Hadoop (registered trademark) is an open source software (OSS) framework for efficiently performing distributed processing and management of large-volume data and is mainly used for analysis processing. Hadoop is applied to a batch processing of a mission-critical system, so that data is distributed to and processed by a plurality of machines, thereby achieving acceleration of large-scale batch processing in which it is required to shorten processing time.

In Hadoop, a master node assigns tasks to a plurality of slave nodes respectively and the slave nodes perform map tasks (Map task) assigned by the master node.

In Hadoop, a file is divided into blocks having the certain size and processing is performed in the map task for each block.

FIG. 15 is a view illustrating an operation overview of a map-reduce framework of Hadoop. In an example illustrated in FIG. 15, a file of 196 MB managed by a Hadoop distributed file system (HDFS) is divided into three blocks having a data size of 64 MB and the three blocks are processed in parallel in three map tasks. Data output from the map task are output as sorted result files by going through shuffle&sort and reduce tasks, and are returned to HDFS.

In such a distributed processing system, it is important that, although a file is divided, data itself is not divided. For example, data called "orange" to be transferred to the map task should not be divided into "oran" and "ge". In such a case where data which should be treated as a single unit is divided could be referred to as data separation.

For this reason, after file dividing of 64 MB is performed, it is necessary to adjust a dividing position of the data. In the default of Hadoop, a line-feed code is used for data dividing, and processing is performed at the position of the line-feed code for dividing, thereby preventing unwillingness data separation. The processing of adjusting the dividing can be customized, and the customization can be achieved by using, for example, an arbitrary character for dividing.

FIG. 16 is a view illustrating a format of a variable-length record sequential file of NetCOBOL.

As illustrated in FIG. 16, the variable-length record sequential file of NetCOBOL is configured by successively connecting a plurality of variable-length records each having record length information of 4 bytes before and after data. Further, the same value is stored in the record lengths arranged before and after the data.

In addition, a user does not need to set and refer to the record length information and a COBOL runtime system performs the setting and referring.

FIG. 17 is a view illustrating a record image of the variable-length record sequential file of NetCOBOL.

In an example illustrated in FIG. 17, although it is viewed that a new line begins for each variable-length record, in practice, a plurality of variable-length records are continuous to one another.

In the case of using the variable-length record sequential file of NetCOBOL in Hadoop, it is difficult to adjust dividing of data after file dividing is performed in the unit of a block. The reason for this is that when the data is a binary value which can be arbitrarily set by a user, and a line-feed code or an arbitrary character is used for dividing, information identical to the line-feed code or dividing character is included and it is difficult to specify a dividing position of data.

FIG. 18 is a view illustrating a record image in a case where a variable-length record sequential file of NetCOBOL is divided into two portions.

In an example illustrated in FIG. 18, when a file is divided in the unit of a block size of 64 MB, data having a data length of 105 bytes is illustrated as being divided in the middle thereof.

Therefore, in NetCOBOL, in order to exactly calculate a position of a record and adjust a data dividing position, there has been used a method of previously generating an information file that maintains a distance (byte length) from a dividing position by a block size to a head position of a subsequent variable-length record and referring to the information file upon processing of dividing adjustment.

FIG. 19 is a view illustrating a variable-length record sequential file of NetCOBOL and an information file.

The information file reads the variable-length record sequential file which is an input file, adds record lengths, and retains information from a position at which dividing is performed in a block size to a subsequent record head position.

In an example illustrated in FIG. 19, in a case where, the information file, for example, a file is divided at positions of 64 MB from a head, a data length from a dividing position to a head of a subsequent variable-length record (data length is 20 bytes) is illustrated as being 55 bytes. Further, there is a need to also designate a block size as a parameter.

[Patent Literature 1] Japanese Laid-open Patent Publication No. 2012-118669

[Patent Literature 2] Japanese National Publication of International Patent Application No. 10-500793

[Patent Literature 3] Japanese Laid-open Patent Publication No. 03-62137

However, in order to generate the above-described information file in an existing distributed processing system, dividing position is calculated by sequentially reading and adding record lengths of variable-length records in an entire processing target file from the beginning thereof. To this end, in a large-sized file of which the data size is dozens to hundreds of GB, and the number of the records is millions, much time is taken to generate the information file. For example, in some cases, a file having a data size of 80 GB takes 15 minutes to generate the information file.

Therefore, Hadoop is introduced in order for reduction in processing time, but time to generate the information file is required. Therefore, in the terms of entire processing time, the effect of shortening time due to Hadoop is ineffective.

SUMMARY

According to an aspect of the embodiments, a dividing method, which divides binary data into a plurality of portions and is processed by a plurality of processing units, includes: assigning partial binary data that is a portion of the binary data to the plurality of processing units, respectively; specifying, by each of the plurality of processing units, a candidate dividing position of the assigned partial binary data based on a characteristic of predetermined data that is included in a binary data and registering information representing the specified candidate dividing position in a storage medium; and judging, by each of the plurality of processing units, validity of the candidate dividing position based on the dividing position information in the storage medium that includes at least information representing data dividing positions of another one of the plurality of partial binary data registered by another processing unit.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 16 is a view illustrating a format of a variable-length record sequential file of NetCOBOL;

DESCRIPTION OF EMBODIMENT(S)

Figure 1:
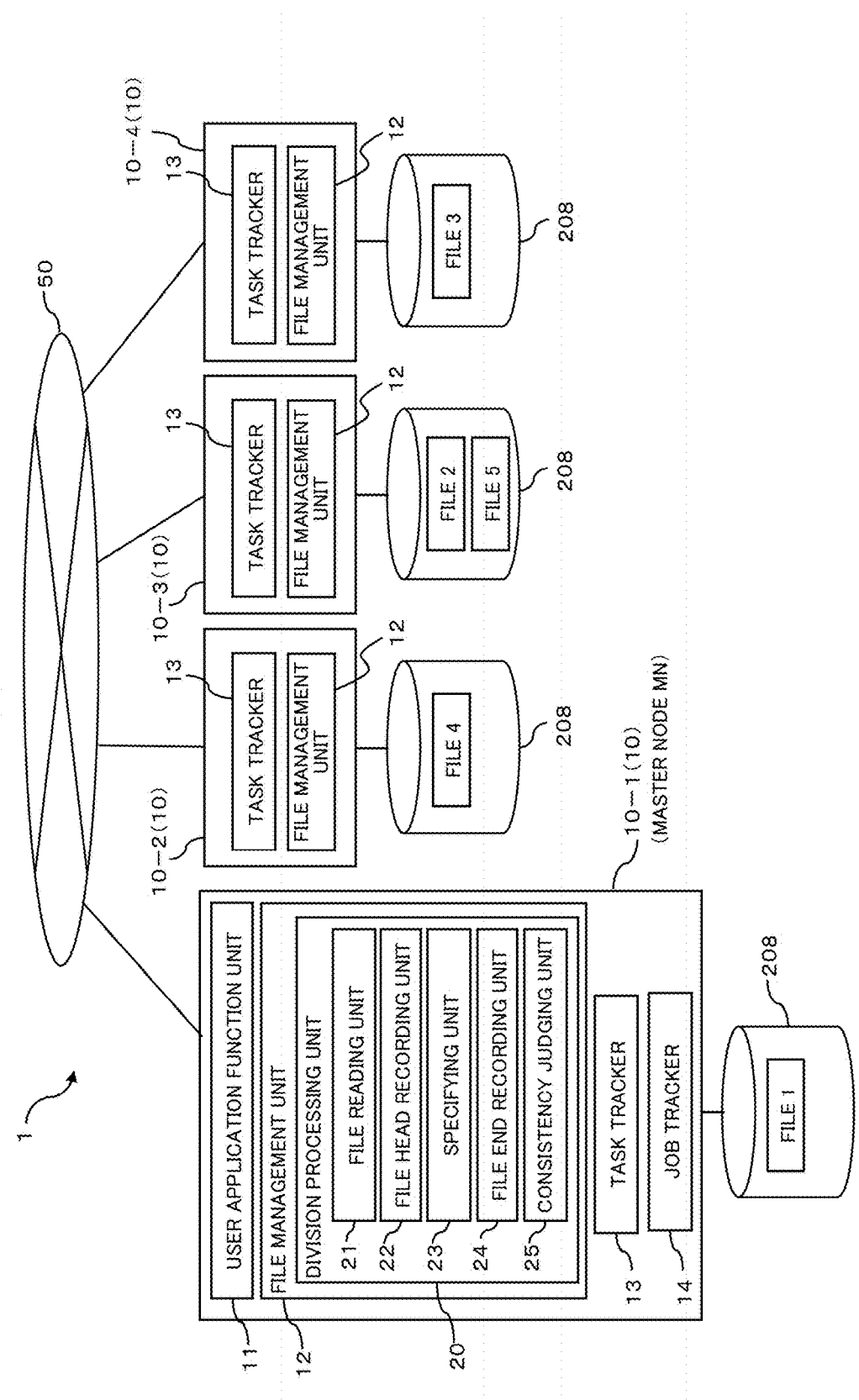
FIG. 1 is a view schematically illustrating a function configuration of a distributed processing system as an example of an embodiment.

Hereinafter, a data dividing program, a data dividing apparatus, and a data dividing method according to embodiments will be described with reference the drawings. Note that the embodiments described below are described by way of example only, and various modifications and applications of techniques that are not provided explicitly in the following embodiment are not intended to be excluded. That is, the present embodiments can be practiced in various ways without departing from the spirit thereof. The drawings are not intended to include only components illustrated in the drawings, but may include other functions.

Figure 2:
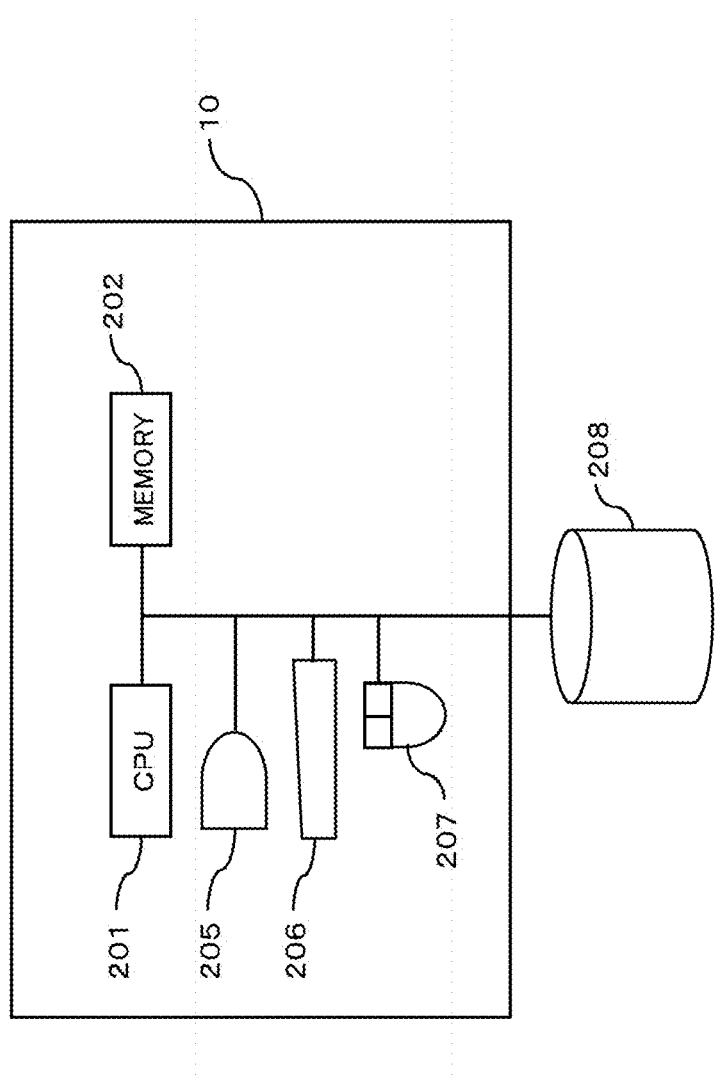
FIG. 2 is a view illustrating a hardware configuration of a server of a distributed processing system as an example of an embodiment.

FIG. 1 is a view schematically illustrating a functional configuration of a distributed processing system 1 as an example of an embodiment, and FIG. 2 is a view illustrating a hardware configuration of a relevant server.

The distributed processing system 1 includes a plurality of (four in an example illustrated in FIG. 1) servers (computation node, node) 10-1 to 10-4, and distributed processing is performed by the plurality of servers 10-1 to 10-4. The distributed processing system 1 is a map-reduce system which realizes distributed processing by using, for example, Hadoop (registered trademark). Hadoop is an open-source platform in which data (file) is distributed to and processed by a plurality of machines, and is a well-known technology, of which the detailed description is omitted.

Figure 17:
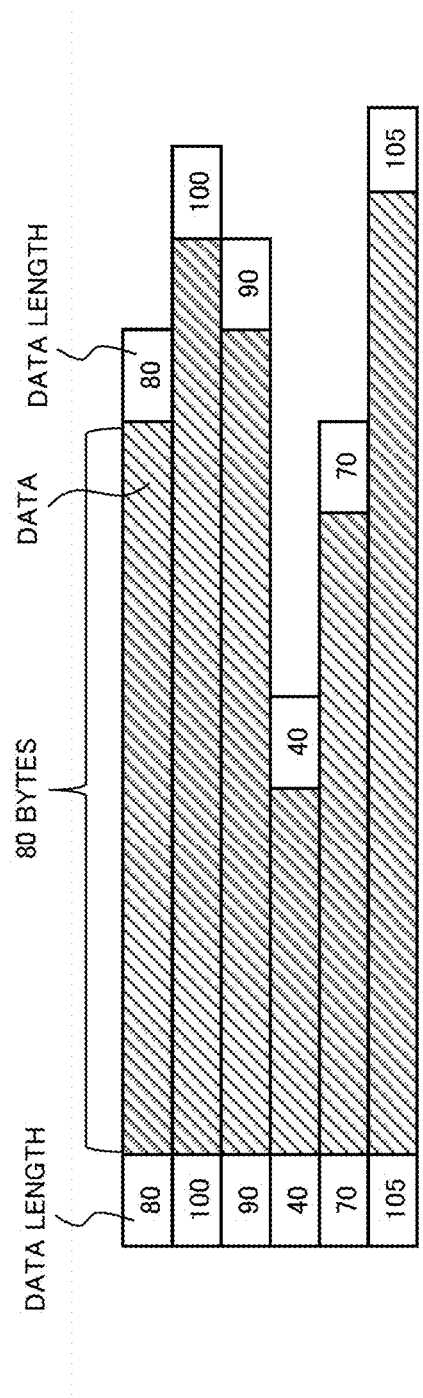
FIG. 17 is a view illustrating a record image of a variable-length record sequential file of NetCOBOL.
Figure 18:
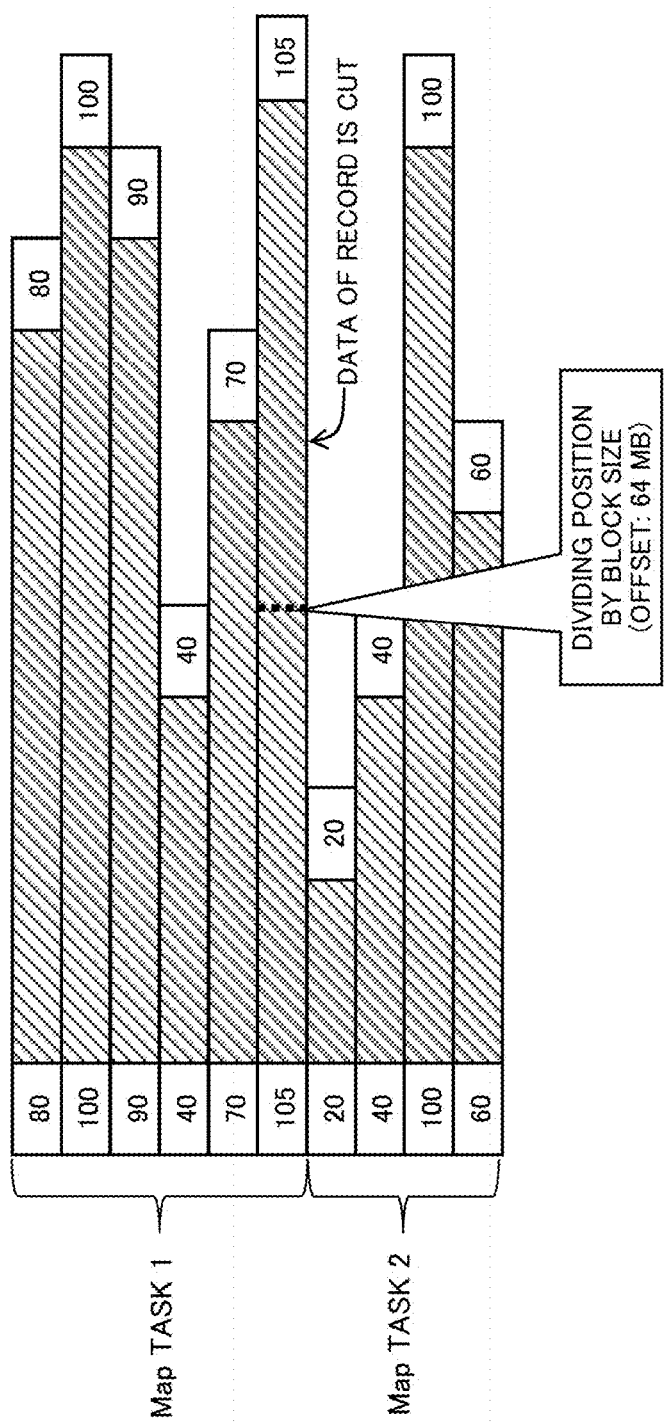
FIG. 18 is a view illustrating a record image in a case where a variable-length record sequential file of NetCOBOL is divided into two portions.
Figure 19:
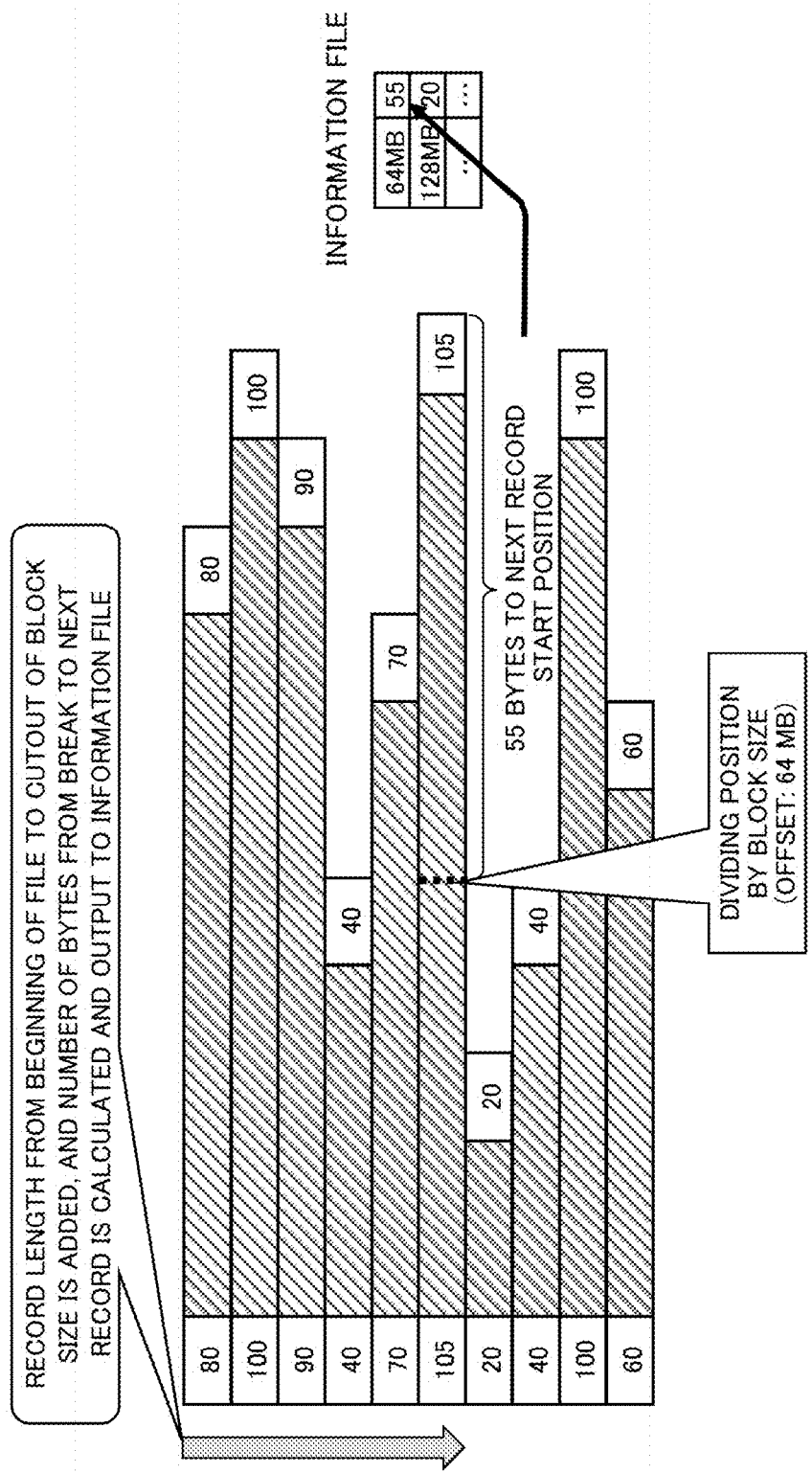
FIG. 19 is a view illustrating an information file and a variable-length record sequential file of NetCOBOL.

Also, the present embodiment is described on the assumption that the processing target file is a variable-length record file (hereinafter merely referred to as a file) complied with NetCOBOL Standard illustrated in FIGS. 16 and 17. That is, the processing target file is binary data, and also is configured by a plurality of successive variable-length records (unit record). In addition, each variable-length record has characteristics (regularity) of a data configuration (structure) in which record length information indicating a data length of relevant data is disposed before and after the data. Note that, in the variable-length record, the record length information before the data is referred to as front record length information and the record length information after the data is referred to as rear record length information.

The respective servers 10-1 to 10-4 are communicably connected to each other through a network 50. The network 50 is a communication line, for example, a local area network (LAN) or the like.

The servers 10-1 to 10-4 are respectively a computer (information processing device and processing unit) equipped with a server function. The respective servers 10-1 to 10-4 include the same configuration. Hereinafter, when it is required to specify one of the plurality of servers, reference numerals 10-1 to 10-4 are used as a reference numeral indicating a server, but when an arbitrary server is indicated, reference numeral 10 is used.

Also, in the example illustrated in FIG. 1, the server 10-1 functions as a master node, and the servers 10-2 to 10-4 function as slave nodes. Hereinafter, there is a case where the server 10-1 is referred to as a master node (MN) and the servers 10-2 to 10-4 are referred to as slave nodes (SN).

The master node MN is an apparatus that manages processing in the present distributed processing system 1 and respectively assigns tasks to the plurality of slave nodes SN. The slave node SN performs a map task (Map task; hereinafter merely referred to as a task) assigned by the master node MN. The plurality of slave nodes SN, to which the tasks are distributed and assigned, concurrently perform the tasks which are respectively assigned, thereby shortening the processing time of a job.

Note that, in the example illustrated in FIG. 1, the master node MN has a function as a task tracker 13 (described below) and also, a function of performing an assigned task at the master node MN. Therefore, the distributed processing system 1 illustrated in FIG. 1, the server 10-1 also functions as the slave node SN.

Also, in the present embodiment, the respective slave nodes SN perform the map task respectively.

The server 10 is, for example, a computer having a server function (information processing device, data dividing device, and processing unit). As illustrated in FIG. 2, the server 10 includes a central processing unit (CPU) 201, a memory 202, a display device 205, a keyboard 206, a mouse 207, and a storage device 208.

The memory 202 is a storage device including a read only memory (ROM) and a random access memory (RAM). The ROM of the memory 202 stores a software program related to distributed processing control and data or the like for the program. The software program on the memory 202 is appropriately loaded to and performed by the CPU 201. Also, the RAM of the memory 202 stores inter-node sharing information 15 which will be described below.

The RAM of the memory 202 is used as a primary storage memory or a working memory. Also, the RAM of the memory 202 functions as a buffer region (not illustrated) that stores a file to be divided.

The display device 205 is, for example, a liquid crystal display or a cathode ray tube (CRT) display, and displays a variety of information.

The keyboard 206 and the mouse 207 are input devices and a user performs various input operations using the input devices. For example, at the master mode MN, the user performs, for example, designation of a processing target file or designation (input) of processing content by using the keyboard 206 or the mouse 207.

The storage device 208 is a storage device that stores a variety of data or programs and is, for example, a hard disk drive (HDD) or a solid state drive (SSD). Also, the storage device 208 is, for example, a redundant arrays of inexpensive disks (RAID) that combines and manages multiple HDDs as one redundant storage.

The CPU 201 is a processing device that performs various controls or calculations, and realizes various functions by executing programs stored in the memory 202.

At the master node MN, the CPU 201 functions as a user application function unit 11, a file management unit 12, a job tracker 14, and a task tracker 13, which are illustrated in FIG. 1.

In addition, programs to realize functions as the user application function unit 11, the file management unit 12, the job tracker 14, and the task tracker 13 are provided in the form of being stored in a non-transitory computer-readable recording medium such as a flexible disk, a CD (e.g., CD-ROM, CD-R, or CD-RW), a DVD (e.g., DVD-ROM, DVD-RAM, DVD-R, DVD+R, DVD-RW, DVD+RW, or HD DVD), a blu-ray disk, a magnetic disk, an optical disk, or a magneto-optical disk. The computer reads the programs from the recording medium, transfers and stores the programs to and in an internal storage device or an external storage device and uses the programs. Further, the programs may be recorded on a storage device (recording medium), such as a magnetic disk, an optical disk, or a magneto-optical disk, and may be provided from the storage device to the computer through a communication path.

In the case of realizing the functions as the user application function unit 11, the file management unit 12, the job tracker 14, and the task tracker 13, the programs stored in the internal storage device (in this embodiment, the memory 202) is executed by a microprocessor (in this embodiment, the CPU 201) of the computer. In this case, the programs recorded on a recording medium may be read out and executed by the computer.

Similarly, at the slave node SN, the CPU 201 functions as the task tracker 13 and the file management unit 12 by executing the programs.

The user application function unit 11 receives a request for a job from the user, generates a map-reduce job (Map-Reduce job; hereinafter simply referred to as a job), and inputs the job (job registration) to the job tracker 14.

When the user inputs performs designation of a processing target file or inputs processing contents (instructed contents) by using the keyboard 206 or the mouse 207, the user application function unit 11 generates a job based on input information.

The job tracker 14 has a function as an assigning control unit, which assigns a task to an available task tracker 13 of a cluster, based on the job registration performed by the user application function unit 11.

The task tracker 13 processes the task assigned by the job tracker 14.

Further, the functions as the user application function unit 11, the job tracker 14, and the task tracker 13 can be realized according to various known methods, and detailed descriptions thereof are omitted.

The file management unit 12 distributes and stores a processing target file to and in storage devices 208 of the plurality of servers 10. Hereinafter, storing data in the storage device 208 of the server 10 is simply expressed as storing data in the server 10. In the example illustrated in FIG. 1, a file 1 is stored in the server 10-1, a file 4 is stored in the server 10-2, files 2 and 5 are stored in the server 10-3, and a file 3 is stored in the server 10-4.

Further, the file management unit 12 divides the processing target file (data) into segments (data blocks, blocks), each of which has a predetermined size (for example, 64

Mbyte) so as to be stored in the storage device 208 of each node. That is, the file management unit 12 has a function as a dividing unit 20, which divides the file, which is binary data, into a plurality of blocks (partial binary data). Also, the server 10 having the function as the dividing unit 20 functions as a data dividing device which processes divided files into which the file is divided. Hereinafter, each portion of the divided files may be referred to as a dividing file.

In addition, the dividing unit 20 has a function of adjusting dividing positions of the dividing files such that all variable-length records included in the assigned dividing files cannot be respectively divided at the point within the dividing file.

When the assigned dividing file (a first partial binary data) is divided at the point within the variable-length record, that is, when a dividing position of a head or end of the dividing file is located at the point within the variable-length record, the dividing unit 20 shifts the dividing position. Thus, the all variable-length records of the dividing files respectively include two record lengths and data (record data). That is, the dividing position is adjusted to prevent the variable-length record of the dividing file being divided into two successive dividing files (so-called a data separation state) and stored.

As illustrated in FIG. 1, the dividing unit 20 includes a file reading unit 21, a file head recording unit 22, a specifying unit 23, a file end recording unit 24, and a consistency judging unit 25.

The file reading unit 21 stores data of a file designated by the user application function unit 11 in a buffer region (not illustrated) of the memory 202. Further, the file reading unit 21 performs initialization of the buffer region when reading the data of the file into the buffer region.

The file head recording unit 22 records information representing a head position of the file in the inter-node sharing information 15.

The inter-node sharing information 15 is information shared between the servers 10 (nodes), and each server 10 respectively records a head position and an end position after adjustment of a dividing position with respect to a dividing file (task) assigned to the server itself.

Figure 3:
FIG. 3 is a view illustrating inter-node sharing information in a distributed processing system as an example of an embodiment.

FIG. 3 is a view illustrating the inter-node sharing information 15 in the distributed processing system 1 as an example an embodiment.

In the example illustrated in FIG. 3, the inter-node sharing information 15 is configured by associating a start position and an end position with a task number.

The task number is identification information that specifies a task assigned to the server 10, and the task represents a dividing file. In the example illustrated in FIG. 3, integers of 1 to 3 are used as the task number. Note that the task number is not limited to an integer, and an arbitrary character string or the like may be used or various modifications may be practiced. Hereinafter, the task number may be referred to as a task ID.

The start position is information representing a start position of the dividing file, and the end position is information representing an end position of the dividing file. As the start position and the end position, for example, address information, in which a head position of a file before dividing is utilized as a reference (for example, 0), is used.

In this way, the memory 202 which stores the inter-node sharing information 15 functions as storage device which stores information representing specified dividing positions (confirmed record head position, confirmed record end position). Further, the file head recording unit 22 and the file end recording unit 24, which store the start position (confirmed record head position) and the end position (confirmed record end position) in the inter-node sharing information 15, function as a registration unit which registers information representing the specified dividing positions in the memory 202.

Further, the inter-node sharing information 15 is stored in the memory 202 of the master node MN and each server 10 updates and refers to the inter-node sharing information 15 stored in the master node MN. That is, each server 10 shares the inter-node sharing information 15.

Note that a storage place of the inter-node sharing information 15 is not limited to the master node MN, and may be variously modified. For example, the inter-node sharing information 15 may be stored in one of the slave nodes SN, or another information processing device (not illustrated) may store the inter-node sharing information 15. Further, the servers 10 may respectively have the inter-node sharing information 15 and synchronize the inter-node sharing information 15 which the respective servers 10 have by performing communication between the servers.

The file head recording unit 22 records the head position of the dividing file (task) specified by the specifying unit 23, which will be described below, in the inter-node sharing information 15 corresponding to a task number of a relevant dividing file as the start position.

The file end recording unit 24 records information representing the end position (confirmed record end position) of the dividing file specified by the specifying unit 23 in the inter-node sharing information 15 as an end position.

The specifying unit 23 specifies a position of a variable-length record (record position, data dividing position) included in the dividing file (a first partial binary data), based on a characteristic (regularity) of a data configuration of the dividing file and specifies a data dividing position (candidate dividing position) based on a characteristic of the variable-length record (predetermined data) constituting the dividing file.

The specifying unit 23 specifies a boundary position between a relevant variable-length record and a subsequent variable-length record based on data length information included in a header of the variable-length record. That is, the specifying unit 23 specifies a position of the relevant variable-length record based on the data length information included in the header of the variable-length record. That is, the specifying unit 23 specifies the position of the variable-length record in the variable-length record, based on characteristics of a data structure in which the record length information representing a data length of relevant data is disposed before and after the data.

When the specifying unit 23 scans the dividing file (a first partial binary data) stored in the buffer region from a beginning thereof, and specifies a position of a leading variable-length record within the dividing file, positions of respective variable-length records subsequent to the leading variable-length record can be specified by referring to their data lengths sequentially. Thus, by specifying a start position of record length information prior to the leading variable-length record of a plurality of variable-length records included in the dividing file, positions of all variable-length records included in the dividing file can be specified. Thus, an end position of a variable-length record positioned at the end of the dividing file can be also specified. That is, the specifying unit 23 specifies the end position thereof by sequentially recognizing respective variable-length records included in the dividing file with respect to the dividing file stored in the buffer region.

Further, a scan position of the dividing file in the buffer region can be specified by, for example, a pointer (not illustrated). Further, a direction directing from a head to an end of the dividing file in the buffer region may be referred to as a scan direction.

The specifying unit 23 specifies a candidate dividing position of the dividing file (a first partial binary data) by performing, for example, the following processing of (A1) to (A6).

Figure 4:
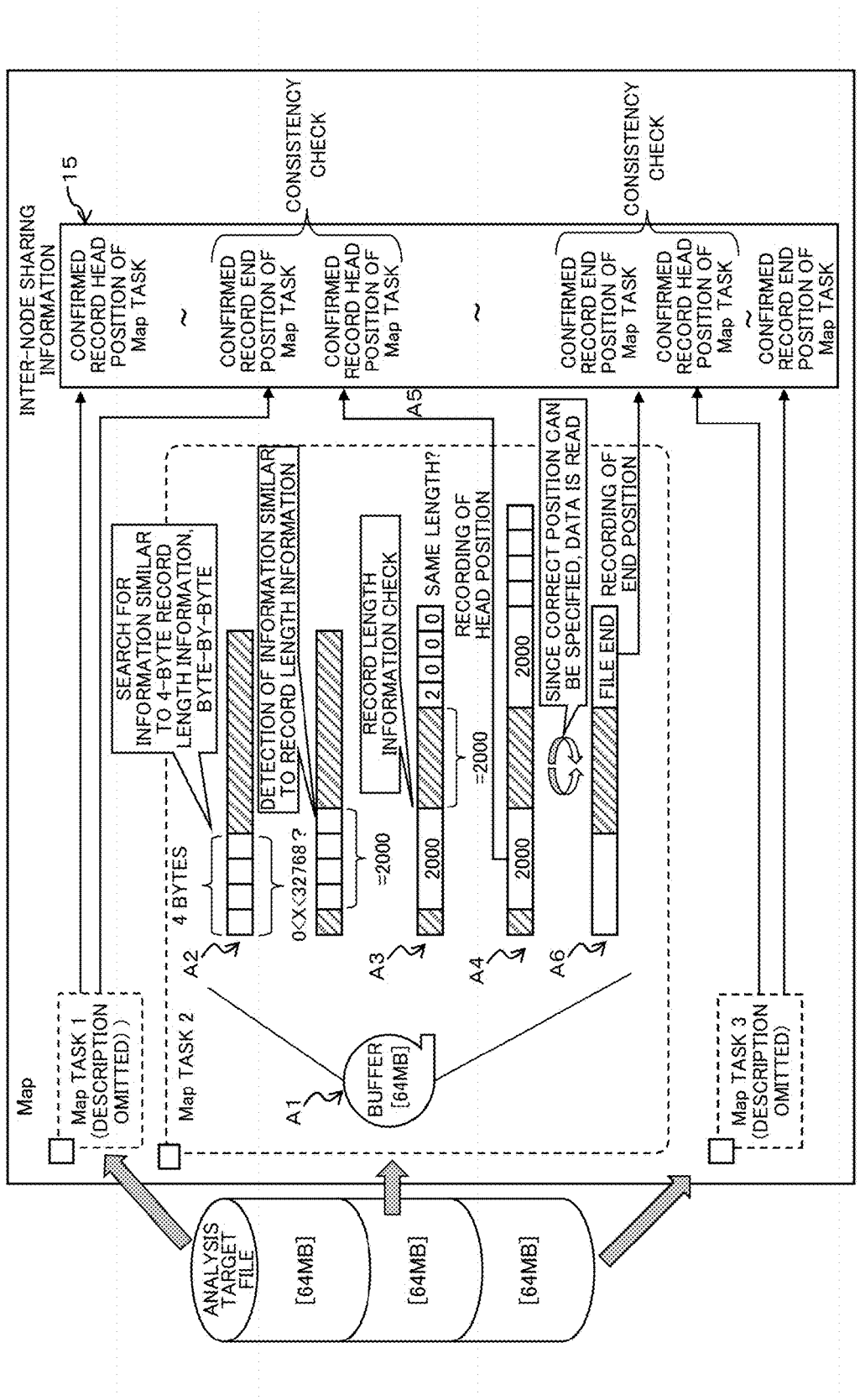
FIG. 4 is a view explaining a method of specifying a dividing position by a specifying unit in a distributed processing system as an example of an embodiment.

FIG. 4 is a view explaining a method of specifying a dividing position by the specifying unit 23 in the distributed processing system 1 as an example of an embodiment. Further, in FIG. 4, for convenience, the map task 2 is illustrated and illustration of the map tasks 1 and 3 is omitted.

(A1) The specifying unit 23 reads out 4 bytes from a head of the buffer region in which the dividing file is stored. In a processing target file, a data position of the read 4 bytes is set to be a temporary head position.

(A2) The specifying unit 23 analyzes a value (X) of the 4 bytes and determines whether the data is a record length.

Specifically, the specifying unit 23 first determines whether the value (X) of the acquired 4 bytes is in a range of 0<X<32768 when looking at the value (X) of the acquired 4 bytes as an unsigned integer. In this case, the reason for comparison with 32767 as the upper limit of X is that the maximum value of a record length of COBOL is 32767.

When the value of the 4 bytes is outside the range of 0<X<32768, it can be determined that the value (X) of the 4 bytes does not represent the record length. In this case, the specifying unit 23 shifts the position at which reading is started behind by one byte in the scan direction, newly reads out data of 4 bytes, and again performs the processing of (A2). When the value of 4 bytes is in the range of 0<X<32768, the process proceeds to processing of (A3).

(A3) Assuming that the value of the acquired 4 bytes (in an example illustrated in FIG. 4, "2000") is the record length information, a determination is performed as to whether record length information (rear record length information) having the same value is present at a position (buffer position) ahead by a record length represented by the record length information in the buffer region in the scan direction.

That is, data of 4 bytes is read out from a position ahead by the record length in the scan direction in the buffer region, and a determination is performed as to whether the data of 4 bytes is identical to a value of 4 bytes acquired previously.

When the same record length ("2000") is not present at the buffer position ahead by the record length (2,000 bytes), it is determined that the value of the acquired 4 bytes is not the record length and the process returns to the processing of (A2). On contrary, when the same record length ("2000") is present at the buffer position ahead by the record length (2,000 bytes), it is determined that the record position can be detected and the process proceeds to processing of (A4).

(A4) Assuming that the value of the acquired 4 bytes is the record length, the file head recording unit 22 is informed of a record head position thereof (confirmed record head position).

(A5) The file head recording unit 22 records the informed confirmed record head position in the inter-node sharing information 15 between nodes in association with a task number corresponding to the dividing file.

Further, when a start position of a record is determined as being correct, processing of reading the record is performed. That is, data of respective variable-length records constituting the dividing file is sequentially read out from a head thereof. In this case, with respect to respective variable-length records, reading is performed while checking consistency between the record length included in a header and the record length of data.

When inconsistency is detected, the processing results of (A3) to (A5) are discarded. The head position at which reading is started in the buffer region is shifted behind by one byte and data of 4 bytes is newly read out to restart from the processing of (A2).

(A6) when the end position of the dividing file which is an analysis object is reached, the specifying unit 23 informs the file end recording unit 24 of information representing the end position as a confirmed record end position.

The above-described confirmed record head position and confirmed record end position are used as dividing positions of the dividing file.

Therefore, the specifying unit 23 functions as a specifying unit that specifies data dividing positions of a dividing file (partial binary data) which is a processing target based on a structural characteristic of a variable-length record constituting binary data.

Thereafter, the consistency judging unit 25 which will be described below performs checking of consistency with a position of the dividing file detected and recorded by another map task by referring to the inter-node sharing information 15 between nodes.

The consistency judging unit 25 determines consistency of the dividing position (candidate dividing position) of a specified dividing file by comparing a position of the dividing file specified by the specifying unit 23 with a position of the dividing file specified in another map task.

The consistency judging unit 25 confirms consistency between the confirmed record head position specified by the specifying unit 23 and an end position of the dividing file detected and recorded in another map task by referring to the inter-node sharing information 15.

Specifically, the consistency judging unit 25 compares the confirmed record head position specified by the specifying unit 23 with an end position (confirmed record end position) of a dividing file recorded in the inter-node sharing information 15 in a map task of processing another dividing file adjacently prior to (preceding) a relevant dividing file in a processing target file. As a result of the comparison, when the confirmed record end position of the preceding dividing file is continuous to the confirmed record head position specified in a relevant map task, the consistency judging unit 25 determines that there is consistency.

Therefore, the consistency judging unit 25 functions as a judge unit that judges validity of the candidate dividing position based on information representing a dividing position associated with another dividing file (partial binary data) registered in the memory 202.

When the consistency judging unit 25 determines that there is consistency, the dividing unit (confirmation unit) 20 sets the confirmed record head position and the confirmed record end position as the data dividing positions of the dividing file. That is, a data range of the dividing file is corrected such that the confirmed record head position is a head, and the confirmed record end position is an end.

Therefore, the dividing unit 20 functions as a confirmation unit that sets the dividing positions of a processing target file (binary data) based on the determined data dividing positions.

The dividing file of which the dividing positions of data are corrected by the file management unit 12 (dividing unit 20) is transferred to the task tracker 13 and processed.

A method of adjusting dividing positions of a dividing file in the distributed processing system 1 as an example of the embodiment configured as described above will be described with reference to a flowchart (steps B1 to B12) illustrated in FIG. 5.

In step B1, the file reading unit 21 stores data of a file designated by the user application function unit 11 in a buffer region (not illustrated) of the memory 202.

Figure 6:
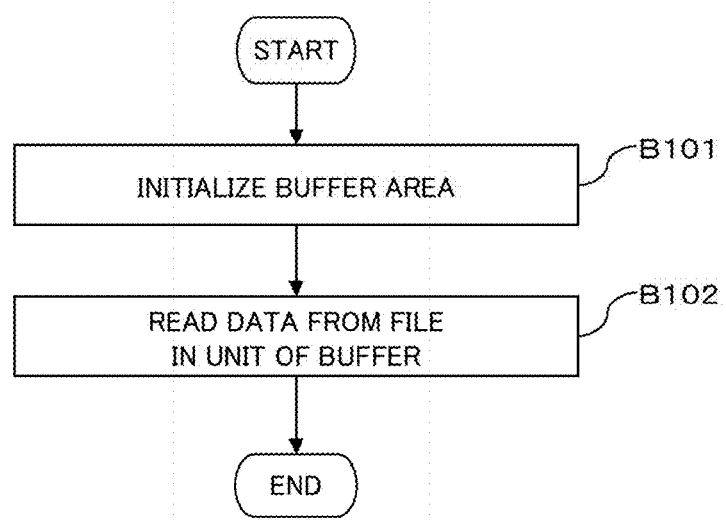
FIG. 6 is a flowchart explaining processing of reading a file by a file reading unit in a distributed processing system as an example of an embodiment.

Processing of reading a file by the file reading unit 21 in step B1 will be described according to a flowchart (step B101 to B102) illustrated in FIG. 6.

The file head recording unit 22 initializes the buffer region of the memory 202 in step B101 and then reads data of the buffer region in the unit of a buffer from a file designated by the user application function unit 11 in step B102.

Figure 5:
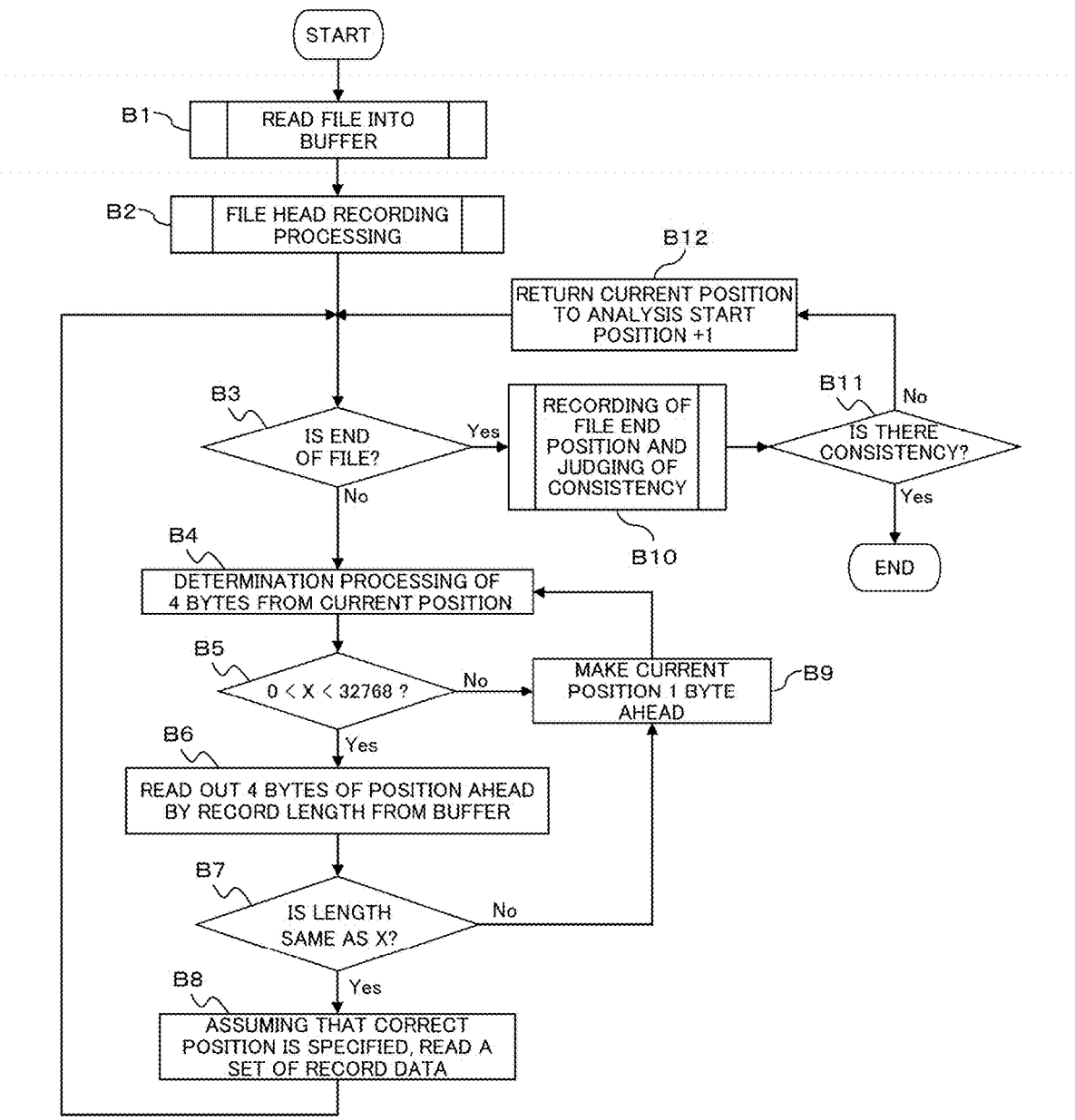
FIG. 5 is a flowchart explaining a method of adjusting a dividing position of a dividing file by a specifying unit in a distributed processing system as an example of an embodiment.

Next, in step B2 of FIG. 5, the file head recording unit 22 records information representing the head position of the file in the inter-node sharing information 15.

Figure 7:
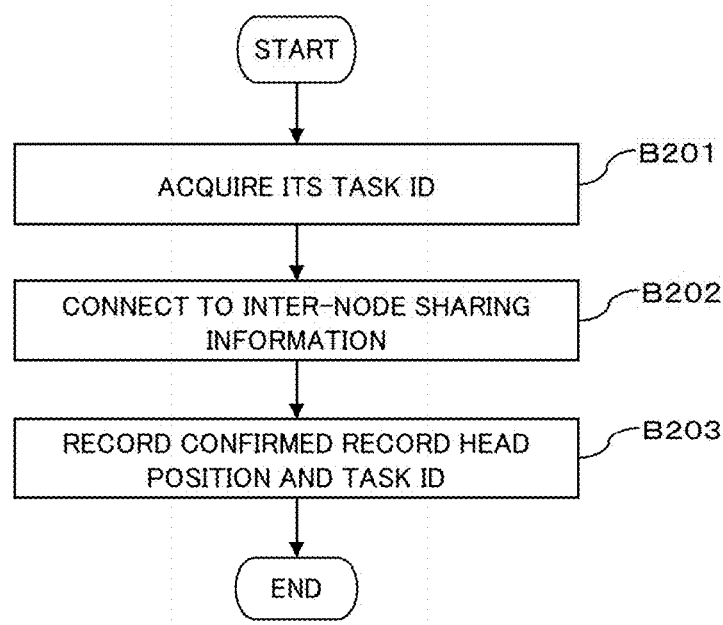
FIG. 7 is a flowchart explaining processing by a file head recording unit in a distributed processing system as an example of an embodiment.

Processing by the file head recording unit 22 in step B2 will be described according to a flowchart (step B201 to B203) illustrated in FIG. 7.

First, in step B201, the file head recording unit 22 acquires a task ID that specifies a task (dividing file) which is being processed. The task ID may be acquired from, for example, the user application function unit 11 or may be arbitrarily set by the file management unit 12 or the like.

In step B202, the file head recording unit 22 is connected to the inter-node sharing information 15, and in step B203, records the task ID and information representing a head position of the dividing file which is a processing target in the inter-node sharing information 15.

Next, in step B3 of FIG. 5, the file reading unit 21 determines whether scanning reaches an end position of the dividing file which is a processing target. That is, a determination is performed as to whether a pointer indicating a position at which processing (scanning) is being performed reaches an end of the dividing file in the dividing file which is a processing target, developed in the buffer region.

When, as a result of the determination, the end of the dividing file is not reached (see No route of step B3), in step B4, the specifying unit 23 reads a value of 4 bytes at a position of the pointer, and starts processing of determining an end position with respect to the value of 4 bytes.

In step B5, a determination is performed as to whether the acquired value (X) of 4 bytes is in a range of 0<X<32768 when looking at the acquired value (X) of 4 bytes as an unsigned integer.

When the value of 4 bytes is in the range of 0<X<32768 (see Yes route of step B5), in step B6, the acquired value of 4 bytes is determined as being a record length (front record length information) and a value of 4 bytes is read at a position (buffer position) ahead by the record length in the buffer region.

In step B7, a determination is performed as to whether the value of 4 bytes acquired in step B4 is identical to a value of 4 bytes which is assumed as rear record length information which is acquired at a buffer position ahead by the record length in step B6.

When the value of 4 bytes acquired in step B4 is identical to a value of 4 bytes acquired in step B6 (see Yes route of step B7), the process proceeds to step B8. That is, the record length of the variable-length record is correctly detected in step B4, data (record data) is read from the variable-length record, and the process returns to step B3.

On the other hand, when the value of 4 bytes is outside the range of 0<X<32768 in step B5 (see No route of step B5) or when the value of 4 bytes acquired in step B4 is not identical to the value of 4 bytes acquired in step B6 (see No route of step B7), in step B9, the position (current position) of the pointer in the dividing file is made ahead by one byte in the scan direction and the process returns to step B4.

Further, when the end of the dividing file is reached in step B3 (see Yes route of step B3), in step B10, the consistency judging unit 25 performs determination for the end position (verification) and the file end recording unit 24 performs recording of the end position.

Figure 8:
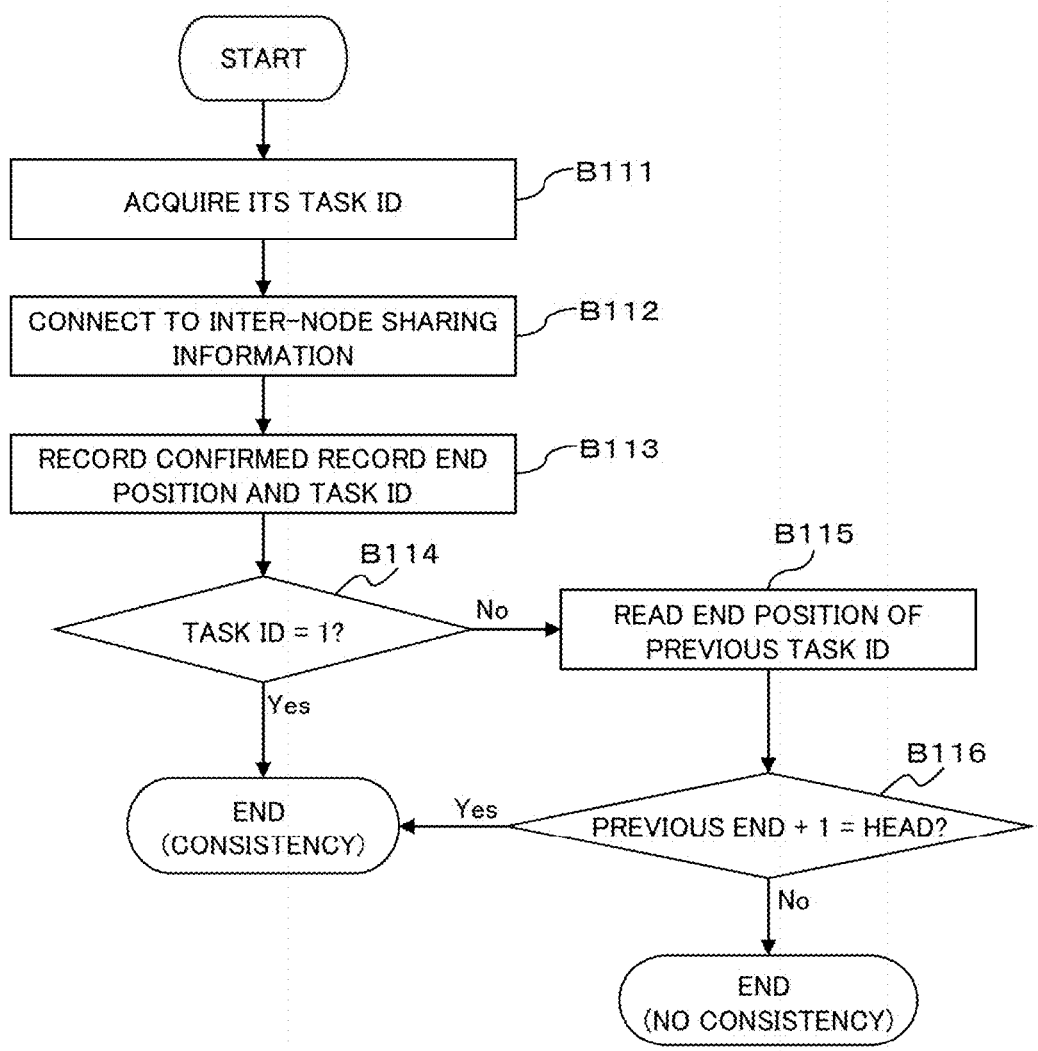
FIG. 8 is a flowchart explaining processing of reading a file by a consistency determining unit and a file end recording unit in a distributed processing system as an example of an embodiment.

Processing by the consistency judging unit 25 and the file end recording unit 24 in step B10 will be described according to a flowchart (step B111 to B116) illustrated in FIG. 8.

In step B111, the consistency judging unit 25 acquires a task ID that specifies a task (dividing file) which is being processed.

In step B112, the consistency judging unit 25 accesses the inter-node sharing information 15, and in step B113, the file end recording unit 24 records the task ID and confirmed record end position in the inter-node sharing information 15.

In step B114, the consistency judging unit 25 determines whether the task ID acquired in step B111 is 1. When as a result of the determination, the task ID is not 1 (see No route of step B114), in step B115, the consistency judging unit 25 reads out a confirmed record end position for another dividing file (that is, preceding dividing file) continuously prior to the dividing file which is being processed in the processing target file, from the inter-node sharing information 15.

In step B116, the consistency judging unit 25 compares a value obtained by adding 1 to a value of the acquired confirmed record end position of the preceding dividing file with a confirmed record head position specified by the specifying unit 23 in the processing target file.

When the value obtained by adding 1 to the value of the acquired confirmed record end position of the preceding dividing file is identical to the confirmed record head position specified by the specifying unit 23 in the processing target file (see Yes route of step B116), it is determined that there is consistency and the process ends.

On the other hand, when the value obtained by adding 1 to the value of the acquired confirmed record end position of the preceding dividing file is not identical to the confirmed record head position specified by the specifying unit 23 in the processing target file (see No route of step B116), it is determined that there is no consistency and the process ends.

Note that it is preferable to record information (for example, flag) indicating a result of consistency determination (whether there is consistency) in a predetermined storage region, such as the memory 202 or the like).

Further, when, as a result of the determination in step B114, the task ID is 1 (see Yes route of step B114), the consistency judging unit 25 determines that there is consistency and ends processing. The reason for this is that there is no preceding dividing file in the head position of a file.

Thereafter, in step B11 of FIG. 5, the specifying unit 23 ends processing when determining that there is consistency by referring to the result of the determination by the consistency judging unit 25 (see Yes route of step B11).

Further, when it is determined that there is no consistency (see No route of step B11), in step B12, the specifying unit 23 shifts a position (current position, confirmed record head position) of a pointer in the dividing file behind by one byte in the scan direction and returns to step B3.

Figure 9:
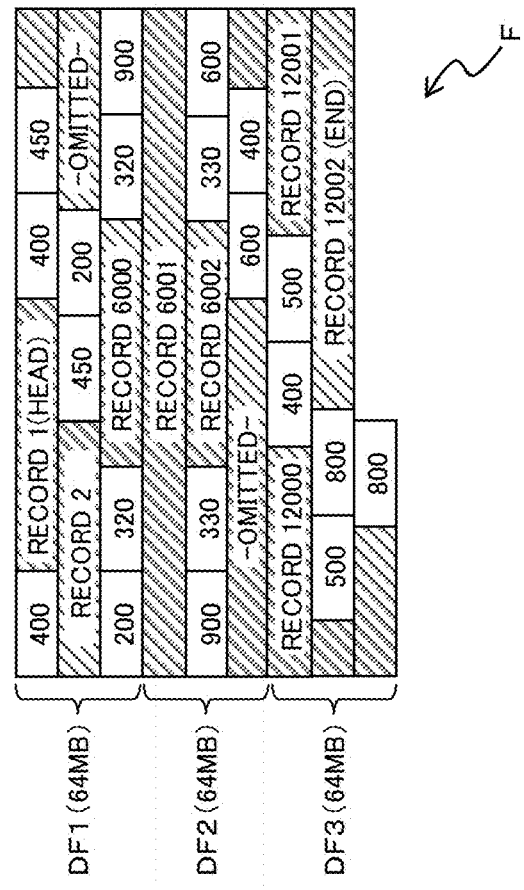
FIG. 9 is a view illustrating an analysis target file in a distributed processing system as an example of an embodiment.

Subsequently, processing of dividing an analysis target file in the distributed processing system 1 as an example of the embodiment configured as described above is illustrated by using FIGS. 9 to 12. FIG. 9 is a view illustrating an analysis target file F. The analysis target file F is a variable-length record sequential file of NetCOBOL. Hereinafter, as illustrated in FIG. 9, there is an example in which the file management unit 12 divides the analysis target file (file) F into three dividing files DF1 to DF3. The respective dividing files DF1 to DF3 respectively have a data size of 64 MB.

Figure 10:
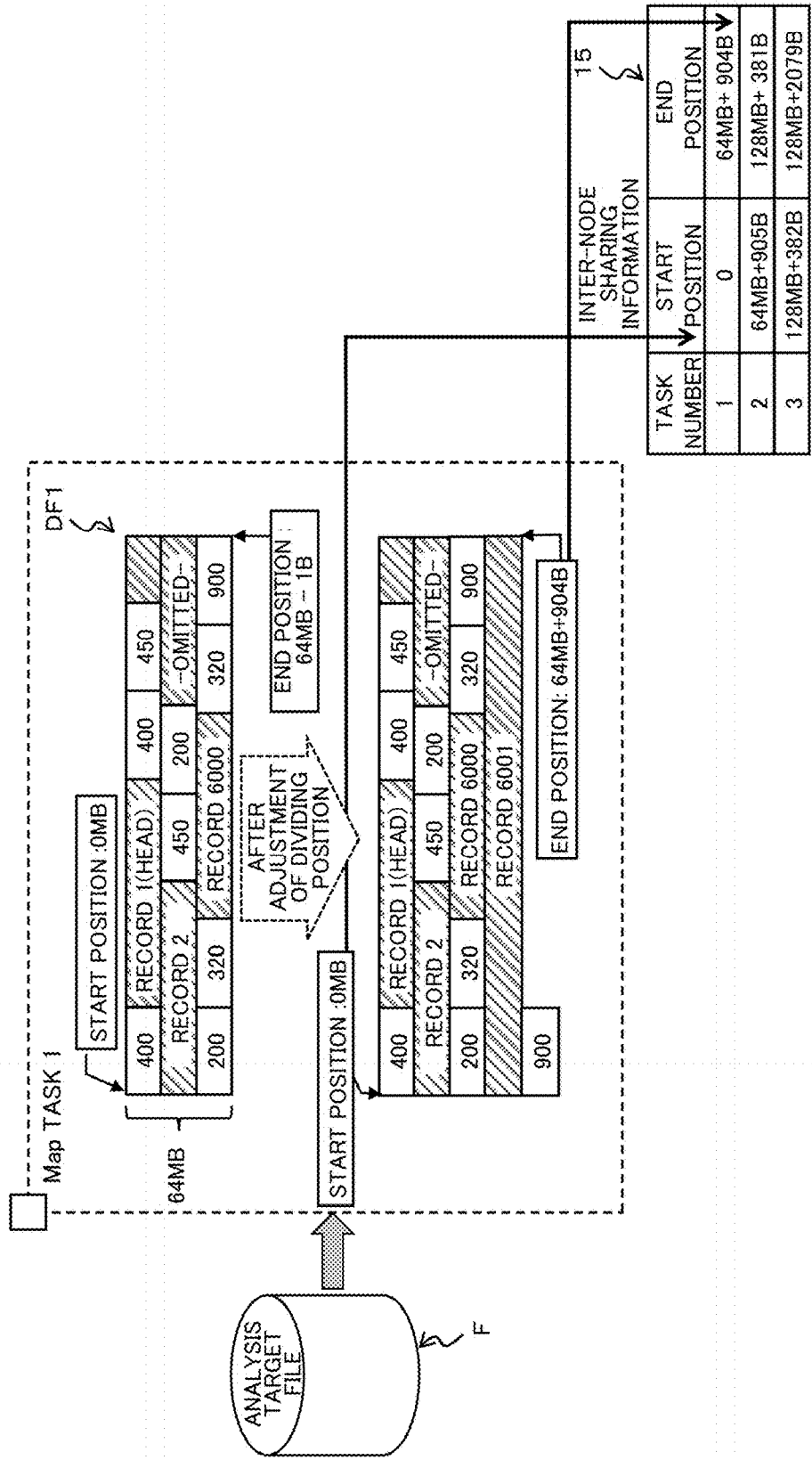
FIG. 10 is a view explaining the analysis target file in a distributed processing system as an example of an embodiment.
Figure 11:
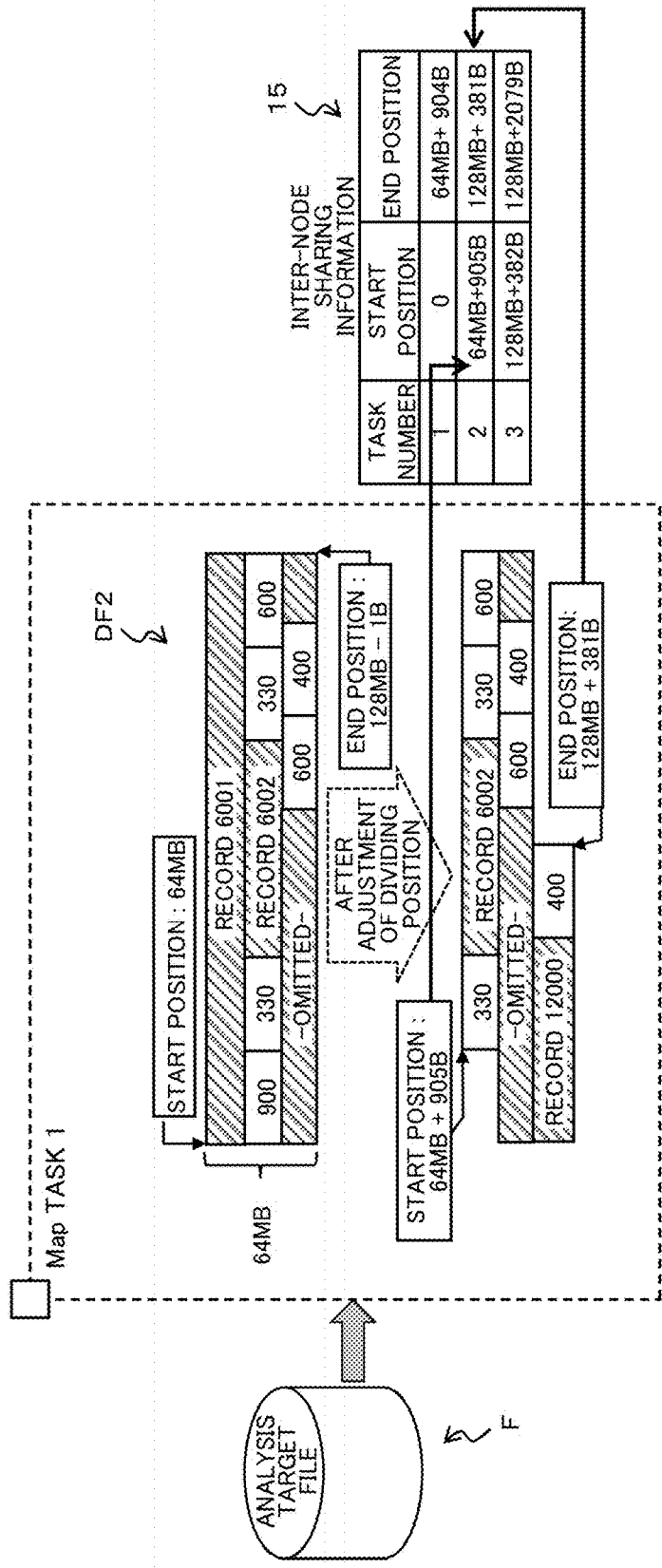
FIG. 11 is a view explaining the analysis target file in a distributed processing system as an example of an embodiment.
Figure 12:
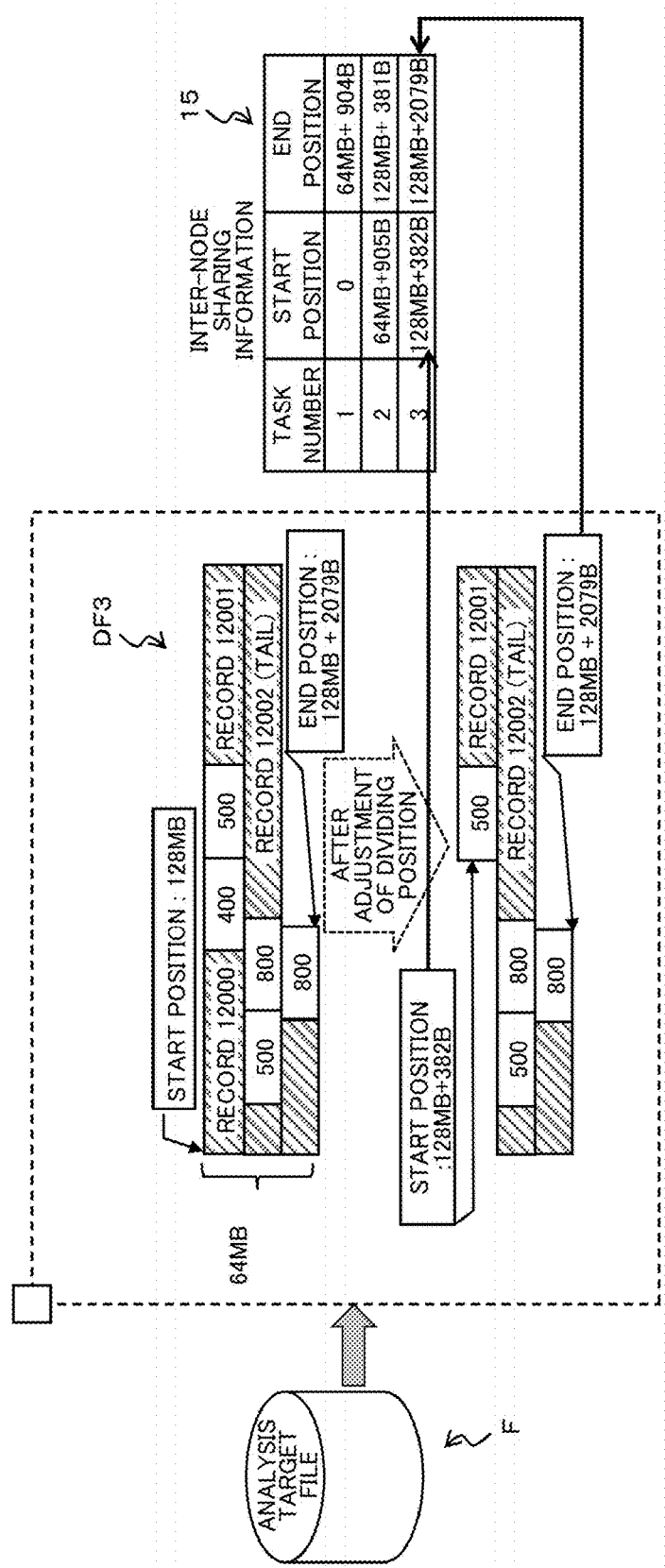
FIG. 12 is a view explaining the analysis target file in a distributed processing system as an example of an embodiment.

FIGS. 10, 11, and 12 illustrate processing related with the dividing files DF1, DF2, and DF3 respectively.

The dividing file DF1 is assigned to a map task (see FIG. 10), the dividing file DF2 is assigned to a map task 2 (see FIG. 11), and the dividing file DF3 is assigned to a map task 3 (see FIG. 12). The dividing files DF1 to DF3 are processed by the map tasks 1 to 3 respectively.

In the map task 1 to 3, dividing positions are adjusted according to the above-described method such that all variable-length records included in the assigned dividing files DF1 to DF3 cannot be divided in the middles thereof, respectively.

In this case, for each map task, the file head recording unit 22 stores the confirmed record head position of the dividing file after adjustment of the dividing position at a start position of the inter-node sharing information 15, and also stores the confirmed record end position at an end position of the inter-node sharing information 15.

Since the dividing file DF1 to be processed in the map task 1 illustrated in FIG. 10 is a leading portion of the analysis target file F, the confirmed record head position thereof is 0 and 0 is registered as a start position of a task number 1 of the inter-node sharing information 15.

Further, the end position of the dividing file DF1 after adjustment of the dividing position is 64 MB+904 B (byte), and 64 MB+904 B is registered as the end position of the task number 1 of the inter-node sharing information 15.

Similarly, with respect to the dividing file DF2 to be processed in the map task 2 illustrated in FIG. 11, the confirmed record head position of the dividing file DF2 after adjustment of the dividing position is 64 MB+905B and 64 MB+905B is registered as a start position of a task number 2 of the inter-node sharing information 15.

Further, the end position of the dividing file DF2 after adjustment of the dividing position is 128 MB+381B, and 128 MB+381B is registered as the end position of the task number 2 of the inter-node sharing information 15.

Similarly, with respect to the dividing file DF3 to be processed in the map task 3 illustrated in FIG. 12, the confirmed record head position of the dividing file DF3 after adjustment of the dividing position is 128 MB+382B and 128 MB+382B is registered as a start position of a task number 3 of the inter-node sharing information 15.

Further, the end position of the dividing file DF3 after adjustment of the dividing position is 128 MB+2079B, and 128 MB+2079B is registered as the end position of the task number 3 of the inter-node sharing information 15.

Therefore, according to the distributed processing system 1 as an example of an embodiment, the specifying unit 23 specifies dividing positions thereof by using regularity of a data configuration of the dividing file which is binary data.

For example, when variable-length records constituting the dividing file have information representing a data length before and after data, scanning is performed from a beginning of the dividing file stored in a buffer region and a portion which is assumed as data (front data length information) representing a record length is detected. When data which is assumed as the same record length is detected at a buffer position ahead by a value (data length) represented by the data which is assumed as the record length, it is considered that a record position of the variable-length record can be detected.

The detection of the record position of the variable-length record is repeatedly performed until the end of the dividing file is reached. When inconsistency is detected on the way thereof, a position determined by making the start position ahead by one byte is set to a newly confirmed record head position and detection of a record position is again performed. Thus, it is possible to verify data dividing.

According to the present distributed processing system 1, the dividing positions (segmentation positions) of the dividing file can be easily specified without sequentially reading and adding the record length of the variable-length record in the entire processing target file from the beginning thereof. Therefore, it is possible to reduce a time necessary for map task processing and perform processing at high speed.

Further, a data range of the dividing file is corrected such that the confirmed record head position is set to a head and the confirmed record end position is set to an end, and therefore, data dividing is not located in the point within the variable-length record, thereby preventing unwillingness data separation due to block dividing.

In this way, even when processing target data is binary data, regularity of data is used and data dividing according to the regularity is verified, thereby preventing unwillingness data separation due to block dividing.

Further, in each map task, the confirmed record head position and the confirmed record end position are recorded in the inter-node sharing information 15 based on the verified data dividing. The consistency judging unit 25 confirms whether an end position of an adjacent dividing file is continuous to the confirmed record head position by referring to the inter-node sharing information 15.

Since the dividing file is binary data, data similar to record length data may be present in the data portion of the variable-length record. Upon verification of a dividing position by the specifying unit 23, a value similar to the record length of data is erroneously recognized as the record length. Also, when a value identical to the value similar to the record length is present at a position ahead by the data length represented by the value similar to the record length, the dividing position may be erroneously specified.

Figure 13:
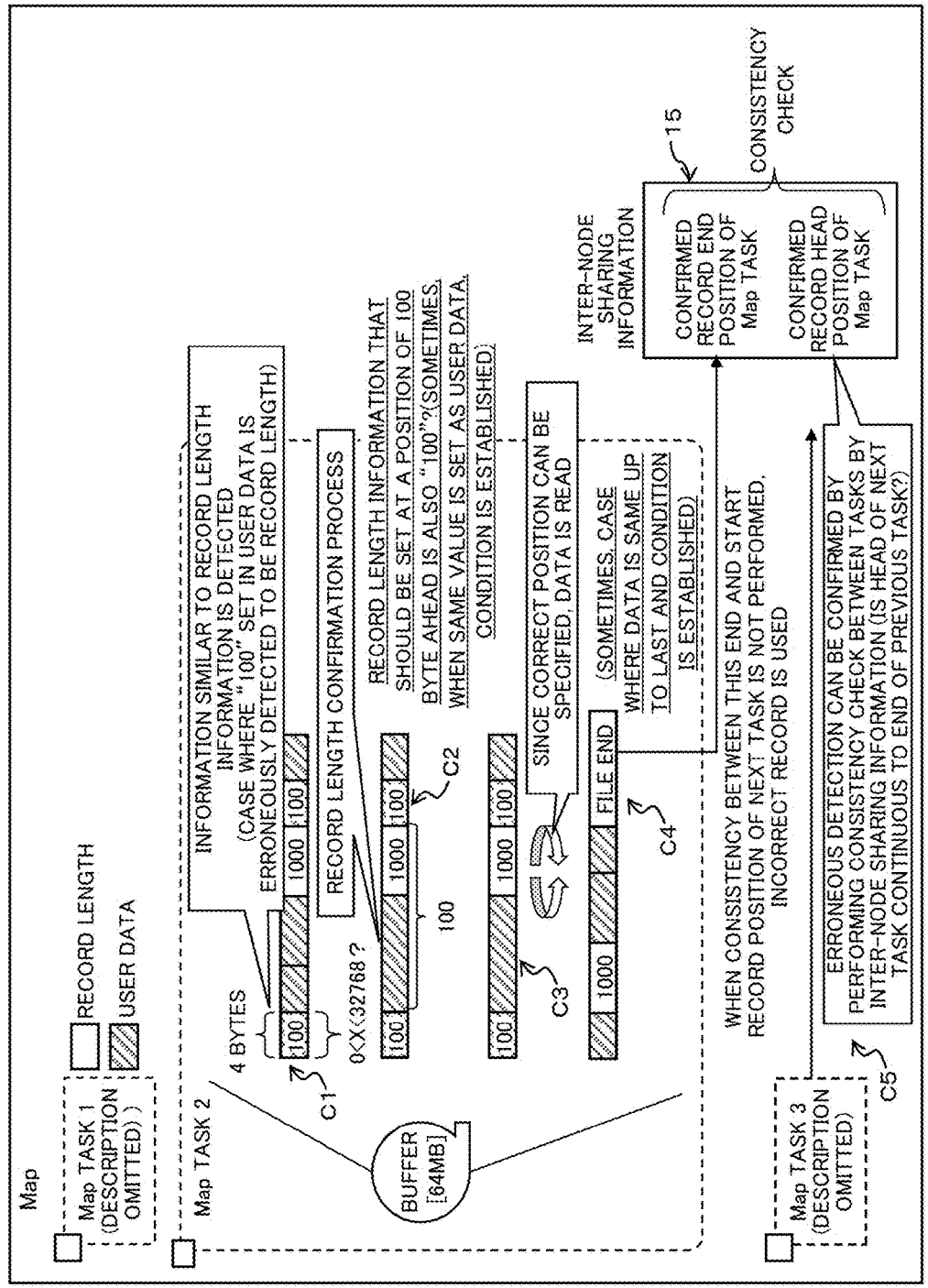
FIG. 13 is a view illustrating erroneous specifying of a dividing position by a specifying unit in a distributed processing system as an example of an embodiment.

FIG. 13 is a view illustrating erroneous specifying of dividing positions which is performed by the specifying unit 23 in the distributed processing system 1 as an example of an embodiment.

When the value of 4 bytes read from the buffer region in which the dividing file is stored is an integer smaller than 32768, the specifying unit 23 erroneously detects the value as a record length. Further, in FIG. 13, for convenience, the map task 2 is illustrated and illustration of the map tasks 1 and 3 is omitted.

In the example illustrated in FIG. 13, it is assumed that the value of 4 bytes read from the buffer region is "100" (see reference numeral C1). Further, in the example illustrated in FIG. 13, an original data length is a portion in which "1000" is written in the drawing.

Assuming that the acquired value ("100") of 4 bytes is a record length, the specifying unit 23 confirms whether there is the same record length data at a position (buffer position) ahead by the record length in the buffer region.

When, as a result of the confirmation, the same "100" is accidentally stored in a region of 4 bytes ahead by 100 bytes (see reference numeral C2), the specifying unit 23 determines that a record position can be detected. Further, reading of data which is regarded as a data portion is performed from the variable-length record (see reference numeral C3). The data read as described above is not correct data because data "1000" representing the original record length is included therein.

Further, in a case where reading is performed on a subsequent portion in the dividing file while checking consistency between the record length included in the header and the record length of data with respect to respective variable-length records, when inconsistency is not detected until the end (see reference numeral C4), read erroneous data is used.

In this case, the specifying unit 23 records the confirmed record head position and the confirmed record end position in the inter-node sharing information 15, and the consistency judging unit 25 can detect erroneous detection by the specifying unit 23 by investigating continuity of a confirmed record head position or a confirmed record end position of another dividing file which is continuous to the dividing file, recorded in the inter-node sharing information 15 by another node (see reference numeral C5).

Therefore, the consistency judging unit 25 can confirm that the detected data dividing has consistency in the whole file by performing confirmation of consistency between nodes, thereby improving reliability.

The disclosed technology is not limited to the above-described embodiments and various modifications can be practiced without departing from the embodiments. Respective configurations and respective processing of the embodiments may be selected or be appropriately combined, depending on needs.

For example, in the above-descried embodiment, the consistency judging unit 25 confirms consistency by determining whether the head position of the dividing file is continuous to the end position of the dividing file detected and recorded in another map task, but the embodiments are not limited thereto.

That is, the consistency judging unit 25 may verify whether the end position of the dividing file specified by the specifying unit 23 is correct.

The consistency judging unit 25 confirms consistency between an end position specified by the specifying unit 23 and an end position of a dividing file detected and recorded in another map task by referring to the inter-node sharing information 15.

Specifically, the consistency judging unit 25 compares the end position specified by the specifying unit 23 with a head position (confirmed record head position) of the dividing file which is recorded in the inter-node sharing information 15 in the map task that processes another dividing file subsequent to the processing target dividing file. When, as a result of the comparison, the confirmed record head position of a subsequent dividing file is continuous to the end position which is reached in the map task, the consistency judging unit 25 may determine that there is consistency.

Although, in the above-described embodiment, there is provided an example where the processing target file is a variable-length record file complied with the specification of NetCOBOL, the embodiments are not limited thereto and various modifications can be practiced.

Figure 14:
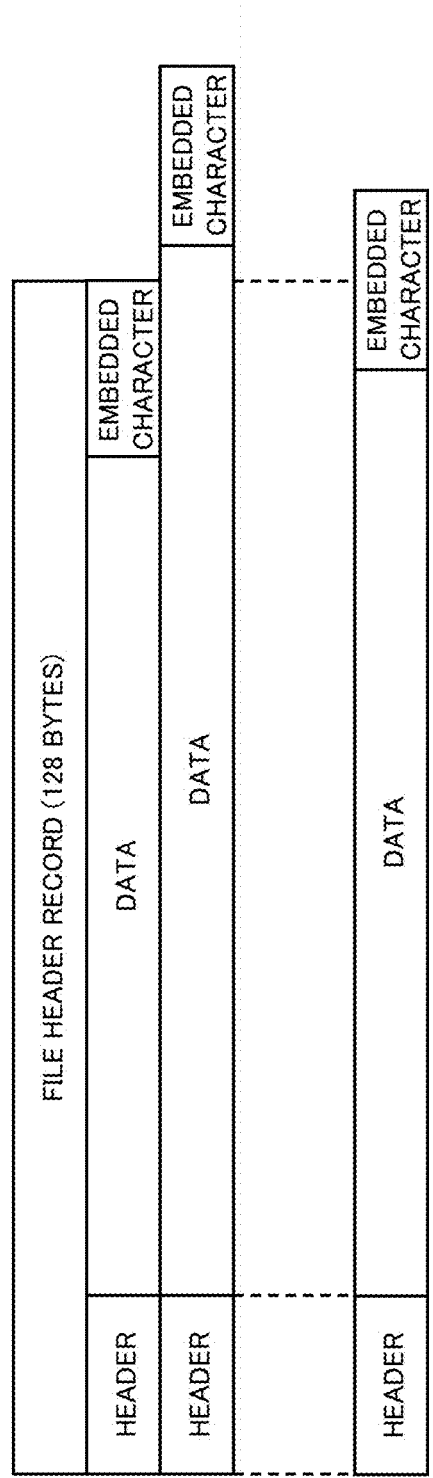
FIG. 14 is a view illustrating a configuration of a record sequential file of MicroFocus.
Figure 15:
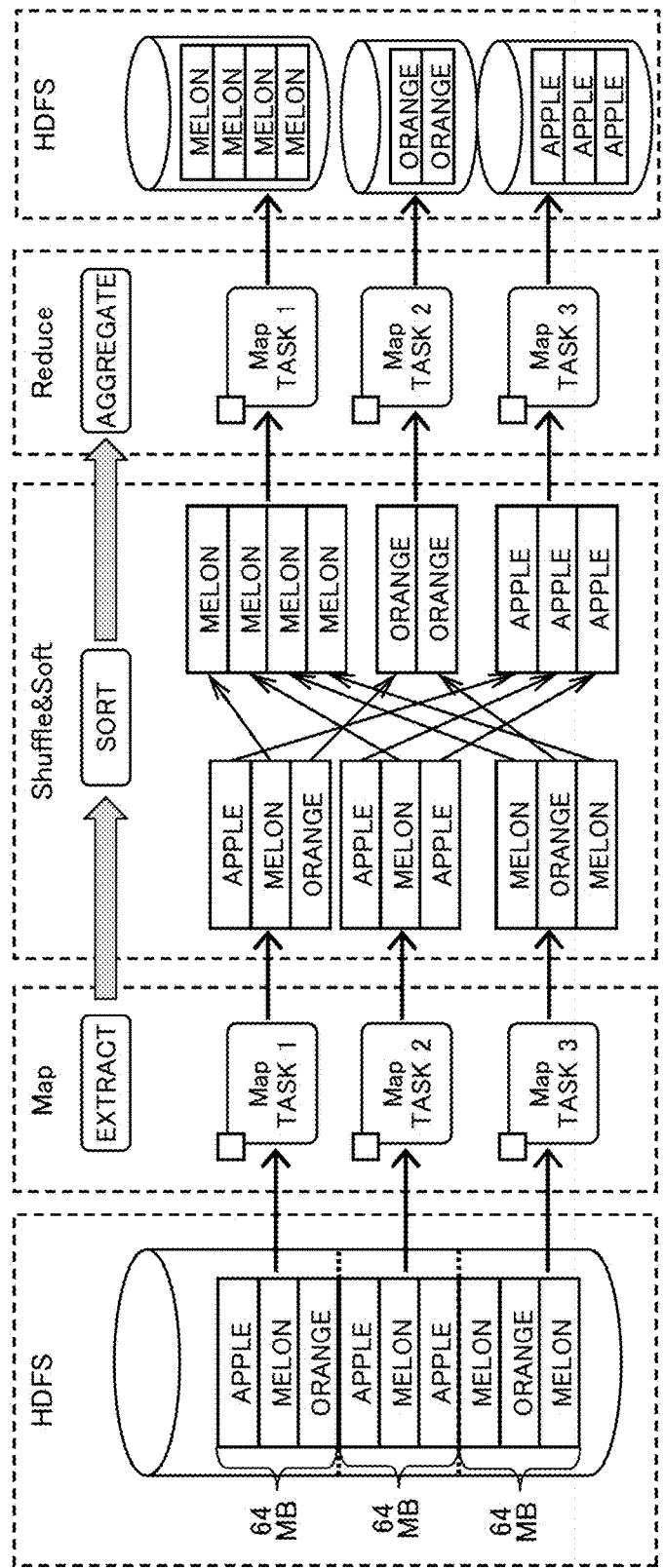
FIG. 15 is a view illustrating an operation overview of a map-reduce framework of Hadoop.

FIG. 14 is a view illustrating a configuration of a record sequential file of MicroFocus.

The record sequential file illustrated in FIG. 14 is configured by variable-length records and each variable-length record includes a record header including a record length before written data (record) and simultaneously includes embedded characters, of which the number is three at most, after the data. The embedded characters are to enable a subsequent record to be started at the boundary of 4 bytes.

Further, the record sequential file includes a file header record of 128 bytes.

In the present distributed processing system 1, the processing target file may be the record sequential file as illustrated in FIG. 14. That is, the specifying unit 23 specifies a position of the variable-length record (data dividing position) included in the dividing file based on regularity of the data structure.

Specifically, the specifying unit 23 may read the record length included in a header in the dividing file stored in the buffer region, read out data having a predetermined size (three characters at most) at a position ahead by the record length, and determine whether the data is an embedded character.

In this way, according to the data structure of a processing target, the specifying unit 23 appropriately changes a data reading position or a comparison target, thereby enabling application to a variety of processing target data.

Further, although the plurality of servers 10 are provided, map tasks are respectively executed by the respective servers 10 and the dividing unit 20 performs specification (correction) of dividing positions of the dividing file in the above-described embodiments, the embodiments are not limited thereto. For example, one server (information processing device) 10 may perform a plurality of map tasks or perform a process as the dividing unit 20 for each map task and specify (correct) the dividing positions of the dividing file.

According to an embodiment, it is possible to perform dividing at high speed.

All examples and conditional language recited herein are intended for the pedagogical purposes of aiding the reader in understanding the invention and the concepts contributed by the inventor to further the art, and are not to be construed limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A non-transitory computer-readable recording medium having stored therein a data dividing program that causes a computer to execute a process comprising:
specifying a candidate dividing position at which a first partial binary data of a processing target is to be divided based on a characteristic of predetermined data that is included in a binary data, the first partial binary data being one of a plurality of partial binary data divided from the binary data;
registering a head position and an end position of the first partial binary data, as information representing the specified candidate dividing position, into dividing position information in a storage medium;
judging validity of the candidate dividing position based on the dividing position information in the storage medium that includes at least information representing a data dividing position of another one of the plurality of partial binary data; and
correcting, when the candidate dividing position is judged to be valid, a data range of the first partial binary data such that the head position is a head and the end position is an end, wherein
the specifying of the candidate dividing position comprises specifying a position of the first partial binary data based on data length information included in each unit record constituting the first partial binary data by extracting record length information from the first partial binary data and confirming whether record length information having a same value as the extracted record length information is present at a position ahead by a record length represented by the extracted record length information in the buffer region in a scan direction.

2. The non-transitory computer-readable recording medium having stored therein a data dividing program according to claim 1, wherein the data dividing program causes a computer to execute judging the validity of the candidate dividing position when the candidate dividing position specified in the first partial binary data of the processing target are continuous to a data dividing position in partial binary data adjacent to the first partial binary data of the processing target in the binary data, registered in the storage medium.

3. The non-transitory computer-readable recording medium having stored therein a data dividing program according to claim 1, wherein the data dividing program causes a computer to execute confirming the candidate dividing position of the binary data based on the candidate dividing position judged as being valid.

4. A data dividing apparatus which processes partial binary data obtained by dividing binary data into a plurality of portions, the data dividing apparatus comprising a processor configured to:

specify a candidate at which position dividing a first partial binary data of a processing target is to be divided based on a characteristic of predetermined data that is included in the binary data, the first partial binary data being one of a plurality of partial binary data divided from the binary data;

register a head position and an end position of the first partial binary data, as information representing the specified candidate dividing positions, into dividing position information in a storage medium;

judge validity of the candidate dividing position based on the dividing position information in the storage medium that includes at least information representing data dividing positions of another one of the plurality of partial binary data; and correct, when the candidate dividing position is judged to be valid, a data range of the first partial binary data such that the head position is a head and the end position is an end, wherein the processor specifies the candidate dividing position by specifying a position of the first partial binary data based on data length information included in each unit record constituting the first partial binary data through extracting record length information from the first partial binary data and confirming whether record length information having a same value as the extracted record length information is present at a position ahead by a record length represented by the extracted record length information in the buffer region in a scan direction.

5. The data dividing apparatus according to claim 4, wherein the processor judges the validity of the candidate dividing position when the candidate dividing position specified in the first partial binary data of the processing target are continuous to a data dividing position in partial binary data adjacent to the first partial binary data of the processing target in the binary data, registered in the storage medium.

6. The data dividing apparatus according to claim 4, wherein the processor further sets the candidate dividing position of the binary data based on the candidate dividing position judged as being valid.

7. A dividing method which divides binary data into a plurality of portions and is processed by a plurality of processing units, the dividing method comprising:

assigning partial binary data that is a portion of the binary data to the plurality of processing units, respectively;

specifying, by each of the plurality of processing units, a candidate dividing position of the assigned partial binary data of a processing target based on a characteristic of predetermined data that is included in a binary data and registering a head position and an end position of the first partial binary data, as information representing the specified candidate dividing position in a storage medium;

judging, by each of the plurality of processing units, validity of the candidate dividing position based on the dividing position information in the storage medium that includes at least information representing data dividing positions of another one of the plurality of partial binary data registered by another processing unit; and correcting, when the candidate dividing position is judged to be valid, a data range of the first partial binary data such that the head position is a head and the end position is an end, wherein the specifying of the candidate dividing position comprises specifying a position of the assigned partial binary data based on data length information included in each unit record constituting the first partial binary data by extracting record length information from the assigned partial binary data and confirming whether record length information having a same value as the extracted record length information is present at a position ahead by a record length represented by the extracted record length information in the buffer region in a scan direction.

8. The dividing method according to claim 7, further comprising judging the validity of the candidate dividing position when the candidate dividing position specified in the assigned partial binary data of the processing target are continuous to a dividing position in partial binary data adjacent to the assigned partial binary data of the processing target in the binary data, registered in the storage medium.

9. The dividing method according to claim 7, further comprising confirming the candidate dividing position of the binary data based on the candidate dividing position judged as being valid.

* * * * *